Nov. 10, 1959     D. T. HURLEY     2,912,575
ELECTRICAL SIGNAL SENSING CIRCUIT
Filed Nov. 2, 1953
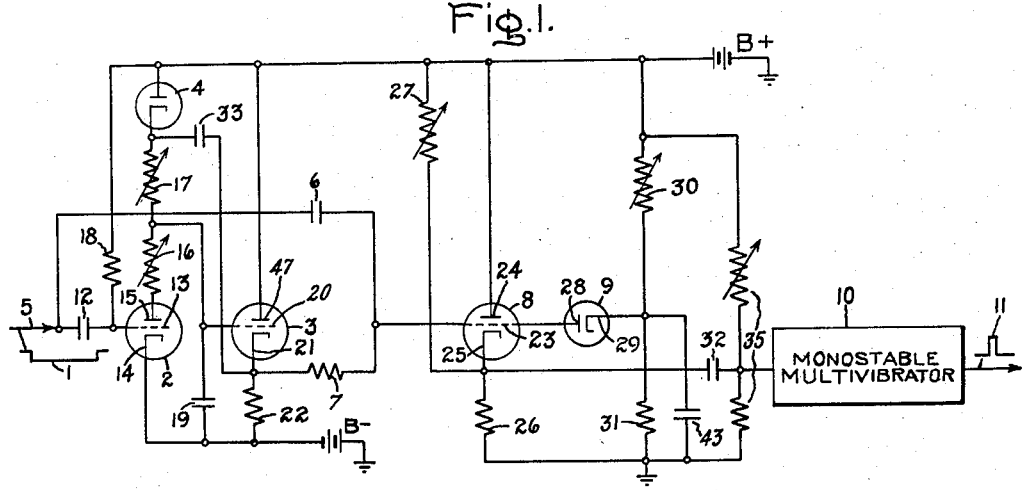
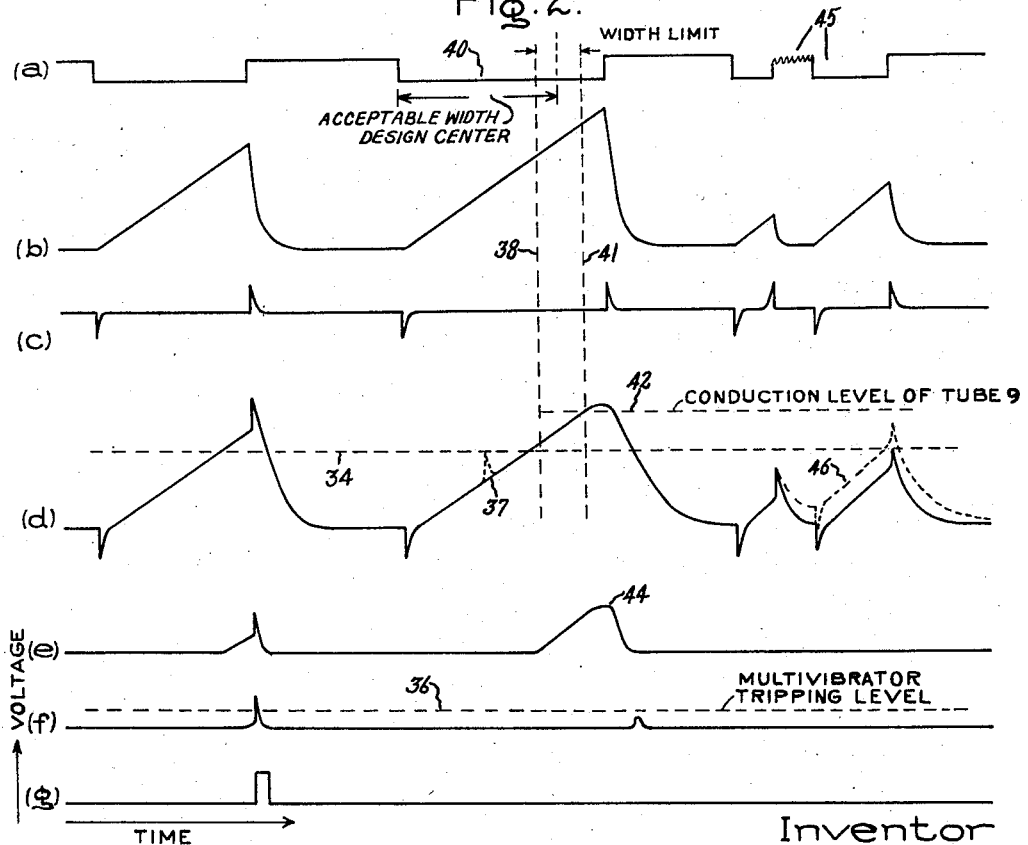
Inventor
Daniel T. Hurley,
by Charles M. Hutchins
His Attorney.

United States Patent Office 2,912,575
Patented Nov. 10, 1959

2,912,575

ELECTRICAL SIGNAL SENSING CIRCUIT

Daniel T. Hurley, Syracuse, N.Y., assignor to General Electric Company, a corporation of New York Application November 2, 1953, Serial No. 389,535

10 Claims. (Cl. 250—27)

This invention relates to pulse shape sensing circuits and particularly to the type adapted to produce electrical output pulses on the basis of the width and continuity of the sensed pulses.

In systems operating in response to applied timing or synchronizing pulses for controlling processes, such as computation or mensuration, the need often arises for selecting applied pulses falling within an acceptable range of widths and continuity to effect proper control. For example, in a communication system employing synchronizing pulses representative of the time during which a coded pulse message is being transmitted, it is desirable at the receiving point to determine whether the synchronizing pulses being received are sufficiently undistorted, or free from interference, to effect satisfactory synchronization, and then to accept or reject the synchronizing pulses upon this determination. In a particular embodiment of the invention to be described shortly, it was desirable from the standpoint of optimum operation that the width of the synchronizing pulses be continuously sensed to determine whether they were within prescribed limits, and also whether there were any undesirable discontinuities in the pulse wave forms.

It is the object of this invention to provide an improved pulse shape sensing circuit.

Another object of the invention is to provide an arrangement for discriminating against pulses on the basis of their width and continuity.

Another object of this invention is to provide an arrangement for selecting pulses having a width within predetermined limits.

Another object of this invention is to provide an arrangement for discriminating against pulses on the basis of discontinuities of their wave shape.

Another object of this invention is to provide an arrangement for generating a signal whenever a pulse is received having an acceptable amplitude wave form.

Another object of my invention is to provide an arrangement for selectively and independently controlling the limits of pulse width and continuity forming the basis for rejection or acceptance of applied pulses.

A further object of this invention is to provide an arrangement for generating a signal timed with the trailing edge of an applied pulse when the width and continuity of the applied pulse is acceptable within prescribed limits.

In a particular application of the invention to a pulse width and continuity processing system, rectangular waves of a predetermined duration are required to be sensed both as to width and continuity and a control signal generated when the synchronizing pulse shape is acceptable. In accordance with the invention each input pulse is processed to yield a marker pulse timed with its trailing edge. Furthermore, each rectangular pulse is employed to generate a saw-tooth wave having a duration equal to its width. Then each saw-tooth wave is combined with its related marker pulse and applied to an amplitude selector circuit. The latter circuit serves to effectively pass the marker pulse only when the prescribed limits of the rectangular pulse shape are met.

The features of the present invention which are believed to be novel are set forth with particularity in the appended claims. The present invention itself, both as to its organization and manner of operation, together with further objects and advantages thereof, may best be understood by reference to the following description taken in connection with the accompanying drawings in which:

Fig. 1 is a circuit diagram of an embodiment of the invention; and

Fig. 2 is a set of wave forms useful in explaining the operation of the circuit diagram of Fig. 1.

In the following description of a pulse shape sensing circuit embodying the invention, certain wave shapes, timing intervals and time constants are assigned to various portions of the system in order to facilitate an understanding of its operation. It is to be understood, however, that such assignments are employed purely by way of example and are not to be construed in any way as limiting the scope of the invention.

Referring to Fig. 1, there is shown a circuit arrangement for sensing the shape of negative-going rectangular pulses 1. In particular the circuit serves to generate an output control pulse only when an applied pulse has a width falling within prescribed limits and is free of gaps, or discontinuities also within prescribed and independent limits. Briefly, the circuit arrangement discloses the use of electron discharge devices 2, 3, and 4 for generating a saw-tooth wave in response to the arrival of each rectangular pulse 1 over lead 5 and which saw-tooth wave has an amplitude dependent upon the width and continuity of the related rectangular pulse. The applied rectangular pulse is differentiated by condenser 6 and resistor 7 to provide a differentiated marker pulse corresponding to its leading and trailing edges, with the trailing edge being of paramount interest. The saw-tooth wave and the differentiated pulse are combined and applied as a composite signal to an amplitude selection circuit comprising electron discharge devices 8 and 9. The latter circuit serves to provide a trigger pulse for operating the multivibrator 10 only when the applied rectangular pulse has the prescribed width and continuity to properly effect the form of the composite signal. The output pulse 11 of multivibrator 10 may then be applied to a utilization device which makes use of the sensing information which has been derived.

Referring to Fig. 1 in detail, the rectangular pulse 1 appearing over lead 5 is applied over the coupling condenser 12 to the control electrode 13 of the electron discharge device 2. Device 2 has its cathode 14 connected to a source of negative potential, B—, and its anode 15 connected through the load resistors 16 and 17 and the conducting diode 4 to a source of positive potential B+. In the normal condition with no pulse being received over lead 5, device 2 is conducting because of its grid 13 being connected to the source of positive potential B+ by the resistor 18, and the anode 15 is therefore at a relatively low potential. Because device 2 is conducting heavily, the potential across condenser 19, and at the control electrode 20 of device 3, is also at a relatively low value by virtue of their connection to the junction of load resistors 16 and 17. Condenser 19, connected between the control electrode 20 and B— operates as part of a saw-tooth wave generator to be described shortly. Device 3, operating as a cathode follower, has its anode 47 connected directly to the source of positive potential B+ and its cathode 21 connected through the load resistor 22 to the source of negative potential B—. In this condition device 3 is conducting very lightly with only a very small voltage being developed across the load resistor 22. The control electrode 23 of device 8 is connected by the coupling resistor 7 to the cathode 21 of device 3 and hence is at a relatively low potential. Device 8 operating as a cathode follower, has its anode 24 connected directly to the source of positive potential B+ and its cathode 25 connected through the load resistor 26 to ground. Device 8 is normally held nonconductive because its cathode 25 is connected by the resistor 27 to the source of positive potential B+. The output of the cathode follower device 3 is also applied through the coupling resistor 7 to the plate electrode 28 of diode 9. Diode 9 has its cathode 29 connected to an intermediate point on the voltage divider comprising resistors 30 and 31 which are serially connected between ground and the source of positive potential B+. Diode 9 is normally nonconductive because its cathode 29 is arranged to be at a relatively higher positive potential than at anode 28 by appropriate selection of the values of resistors 30 and 31.

Thus, with no rectangular signal available over lead 5, devices 2, 3, and 4 are conducting whereas devices 8 and 9 are not conducting. The input circuit of multivibrator 10, which provides the desired output pulse 11 is connected by the coupling condenser 32 to the cathode 25 of device 8. The multivibrator 10 is of the monostable type, which is arranged to be triggered into an unstable condition upon the application of an input pulse, and which returns to its normal, stable operating condition after a predetermined time interval. With no input signal applied to lead 5 multivibrator 10 remains in its stable condition.

Upon the arrival of a negative-going rectangular pulse 1 over lead 5, device 2 is rendered nonconductive and remains so for the duration of the input pulse 1. With device 2 nonconductive, condenser 19 is permitted to charge up in the positive direction towards B+ as shown by Fig. 2b. Since this positive-going voltage wave is applied directly to the control electrode of device 3 it causes a corresponding saw-tooth wave shape to be developed at its cathode 21. A portion of this saw-tooth signal is fed back over the coupling condenser 33 and resistor 17 to the condenser 19 in a manner to insure that a desired linearity of saw-tooth output wave is derived at cathode 21. It should be noted that as soon as the positive-going feed back is developed through the condenser 33, the cathode of diode 4 is caused to go positive with respect to its anode thereby cutting off diode 4. Diode 4 is kept cut off for the duration of the saw-tooth wave of Fig. 2b. During the rising portion of the positive-going saw-tooth wave 2b, the grid 20 of device 3 is driven progressively more and more positive, thereby causing the voltage at the cathode 21 to rise in a positive-going saw-tooth fashion toward B+.

The linearly-rising saw-tooth wave developed at the cathode 21 is applied simultaneously over resistor 7 to the control electrode 23 of the normally nonconductive device 8 and the anode 28 of the normally nonconductive diode 9. The rectangular pulse 1, available over lead 5, is also applied through the condenser 6 to the control electrode 23 of device 8 and the anode 28 of diode 9. The condenser 6 and resistor 7 and 22 are dimensioned to differentiate the negative-going pulse 1 as shown in Fig. 2c such that upon combination a negative-going pulse is superimposed on the positive-going saw-tooth wave at the start of the pulse 1, and a positive-going differentiated pulse is superimposed at the trailing end of the saw-tooth wave as shown in Fig. 2d. As shown in Fig. 2d, device 8 is arranged to conduct whenever the voltage at its grid 23 reached the predetermined positive level shown in dotted lining at 34. Accordingly, as soon as the composite wave form in Fig. 2d reaches this predetermined level, device 8 conducts and causes the remainder of the composite waveform above this level to be developed at its cathode 25 as shown in Fig. 2e. The portion of the composite signal selected by the biased cathode follower 8 is filtered by the high pass filter comprising condenser 32 and resistor chain 35 to yield the waveform shown in Fig. 2f, which is then applied to the input of multivibrator 10. Thus, whenever an acceptable pulse 1 arrives over lead 5, device 8 generates a pulse of sufficient amplitude to trigger multivibrator 10 and cause it to generate an output pulse timed with the trailing edge of the pulse 1 as shown in Fig. 2g. The multivibrator tripping level 36, Fig. 2f is varied by means of the adjustable voltage divider 35, Fig. 1, which may form part of the input circuit of multivibrator 10.

It has been assumed in the previous discussions that the pulse appearing at the input lead 5 was of perfect width and had no undesirable gaps. However, in accordance with the invention, it is desirable that an arrangement be provided to sense and reject the input pulses 1 whenever they deviate from a prescribed form. Referring to Fig. 2a, if the pulse 1, available over lead 5 should have an undesirably narrow width, the positive-going differentiated pulse developed by condenser 6 and resistor 7 would occur, say at 37, Fig. 2d, which is to the left of the minimum acceptable width limit line 38. Limit line 38 is established by the conduction level 34, of tube 8, shown in Fig. 2d. It should be recalled that this level is selected by adjustment of the relative values of resistors 27 and 26 in Fig. 1. Thus any incoming pulses having an undesirably narrow width, result in the generation of a composite signal, Fig. 2d, of insufficient amplitude to cause device 8 to conduct. Thus no tripping signal is developed for application to multivibrator 10.

On the other hand, if the incoming pulse is of an undesirably long width, as shown at 40, Fig. 2a, the positive-going differentiated pulse would fall to the right of the maximum width limit line 41. Limit line 41 is established by the conduction level 42, Fig. 2d, of tube 9 which it should be recalled is selected by adjustment of the relative values of resistors 30 and 31 in Fig. 1. Thus any incoming pulse having an undesirably long width results in a sufficiently positive-going composite signal being developed at the anode electrode 28 to cause device 9 to conduct. Upon conduction of device 9, condenser 43 becomes effective to substantially attenuate the positive-going, differentiated pulse portion of the composite signal such that a rounded off form of saw-tooth wave is developed at the cathode 25 of device 8. Since the differentiated pulse portion has been effectively removed from the composite wave appearing at cathode 25, no pulse can be developed at the output of the high pass filter circuit comprising condenser 32 and resistance divider 35 with which to trigger the multivibrator 10.

While the system has been shown to be capable of sensing input pulses above and below selectively prescribed values of width, in the sense that no output signal is derived from multivibrator 10 for these conditions, the system is also capable of sensing gaps or holes of undesirable width in the input pulses. For example, if a pulse of the form shown at 45 in Fig. 2a arrives over lead 5 at the control electrode 13 of device 2 in Fig. 1, it causes a composite waveform of the type shown in Fig. 2d to be developed at the control electrode 23 of device 8. It should be noted that this waveform comprises a double sawtooth wave upon which are superimposed respective pairs of differentiated pulses. The occurrence of a gap in the arriving pulses thus is treated by the circuit arrangement essentially as an undesirably narrow pulse, such that device 8 cannot be triggered and cause an output pulse 11 to be generated.

The circuit arrangement disclosed can be readily adjusted to change the maximum acceptable hole or gap size by varying the value of resistor 16 in Fig. 1. This variation effectively alters the discharge rate of condenser 19 through resistor 16 and the electron discharge path of device 2 as shown by 46 of Fig. 2d. Thus curve 46 illustrates the condition where an adjustment has been made to accept a larger hole or gap in the incoming pulse 1.

Although not shown, the differentiated pulse portion of 45 would appear at the cathode 25 of device 8, Fig. 1, and be of sufficient amplitude to trigger multivibrator 10 and cause an output pulse 11 to be generated.

Furthermore, by adjustment of resistor 17, the rate of rise of the saw-tooth wave developed at the cathode 21 is altered to permit some variation in the design pulse width center of acceptable pulses.

Thus it is seen that applicant's novel arrangement is capable of sensing the arrival of undesirably long or undesirably short pulses, as well as sensing gaps or holes within the pulse wave shape itself. Furthermore applicant's simple arrangement is sufficiently versatile to permit the limits of acceptable width and gap size to be selectively and substantially independently controlled.

While particular embodiments of the present invention have been shown and described, it will be obvious to those skilled in the art that changes and modifications may be made without department from this invention in its broader aspects and therefore the aim in the appended claims is to cover all such changes and modifications as fall within the true spirit and scope of the invention.

What I claim as new and desire to secure by Letters Patent of the United States is:

1. An arrangement for sensing width variation in applied pulses comprising means responsive to the width variation of said applied pulses for providing corresponding linear amplitude varied pulses with corresponding time duration, means for differentiating said applied pulses to provide differentiated pulses, means for combining said amplitude varied pulses and said differentiated pulses to derive composite pulses, and means to detect only those composite pulses within a predetermined amplitude level range.

2. An arrangement for sensing width variation in applied pulses comprising means responsive to the width variation of said applied pulses for providing corresponding amplitude varied pulses, means for differentiating said applied pulses to provide differentiated pulses, means for adding said amplitude varied pulses and said differentiated pulses to derive added pulses, means to cancel the differentiated pulse portions of said added pulses in response to said added pulses exceeding a given amplitude level, means to detect the differentiated pulse portions of said added pulses having an amplitude between a given second level and said given amplitude level, and means for generating a signal in response to each of said detected pulses.

3. An arrangement for sensing width variation in applied pulses comprising means responsive to the width variation of each of said applied pulses for providing corresponding amplitude varied waves corresponding in time therewith, means for differentiating said applied pulses to provide differentiated pulses, means for adding said amplitude varied waves and said differentiated pulses to derive resultant signals, and means for providing output signals in response to said resultant signals falling within a predetermined range of amplitude levels comprising means for extracting the differentiated pulse portions from only those resultant signals falling within said range of amplitude levels, and means responsive to said extracted pulse portions for providing said output signals.

4. An arrangement for deriving a control signal when a hole, smaller than a predetermined width, occurs in an applied pulse comprising means responsive to said applied pulse and the occurrence of a hole in said applied pulse for providing a saw-tooth wave having an amplitude variation corresponding to the width of said hole, means for differentiating said applied pulse to provide a differentiated pulse, means for superimposing said differentiated pulse onto said saw-tooth wave to derive a composite pulse, means responsive to the superimposed differentiated pulse portion of said composite pulse falling within a predetermined minimum and maximum amplitude level to select the differentiated pulse portion of said composite pulse, and means responsive to said selected pulse portion for providing said control signal.

5. An arrangement for deriving a control signal related to a predetermined variation in width of an applied pulse comprising means responsive to the width variation of said applied pulse for providing a corresponding amplitude varied pulse corresponding in time therewith, means for differentiating said applied pulse to provide a differentiated pulse, means for superimposing said differentiated pulse onto said amplitude varied pulse to derive a composite pulse, means to select only the differentiated pulse portion of said composite pulse when said composite pulse is of a predetermined amplitude lying within a predetermined range, and means responsive to said selected pulse portion for providing said control signal.

6. An arrangement for deriving a control signal when the width of an applied pulse is within prescribed limits comprising means responsive to the variation in width of said applied pulses for providing a corresponding amplitude varied pulse of the duration of said applied pulse, means for differentiating said applied pulse to provide a differentiated pulse, timed with the trailing edge of said applied pulse, means for superimposing said differentiated pulse onto said amplitude varied pulse to derive a composite pulse, means to select only the differentiated pulse portion of said composite pulse when said composite pulse is of an amplitude within a predetermined range, and means responsive to said selected pulse portion for providing said control signal.

7. In combination, a source of an applied pulse, means responsive to said pulse for generating a wave having an amplitude corresponding to the width of said pulse, means for differentiating said pulse to derive a differentiated pulse timed with the trailing edge of said rectangular pulse, means for superimposing said differentiated pulse onto said wave to derive a composite wave, means operative only to an amplitude of said composite wave lying between a predetermined minimum amplitude value and a predetermined maximum amplitude value to pass said differentiated pulse portion, and means responsive to said passed portion for generating an output signal timed therewith.

8. In combination, a source of a rectangular pulse, a saw-tooth generator responsive to said pulse for generating a saw-tooth wave of the duration of said pulse and having an amplitude corresponding to the width of said pulse, a device for differentiating said pulse to derive a differentiated pulse timed with the trailing edge of said rectangular pulse, an addition circuit for superimposing said differentiated pulse onto said wave to derive a composite wave, a normally inoperative pulse attenuating circuit responsive to a predetermined maximum amplitude value of said composite wave to become operative and attenuate the differentiated pulse portion of said composite wave, a cathode follower circuit biased to be normally nonconductive, said cathode follower circuit responsive only to an amplitude of said composite wave lying between a predetermined minimum amplitude value and said maximum amplitude value to become conductive and pass said differentiated pulse portion, and a multivibrator circuit biased to respond only to said passed portion having a predetermined shape and an amplitude greater than a predetermined minimum amplitude level for generating an output signal timed therewith.

9. In combination, a source of rectangular pulses, means responsive to each of said pulses for generating a corresponding saw-tooth wave having an amplitude corresponding to the width of its related pulse, means for differentiating said pulses to derive differentiated pulses timed with the trailing edge of their related rectangular pulses, means for superimposing each of said differentiated pulses onto a related wave to derive a composite wave, means responsive to a predetermined maximum amplitude value of each of said composite waves to attenuate the differentiated pulse portion of said composite waves, and means operative only to the amplitude of each of said composite waves lying between a predetermined minimum amplitude value and said maximum amplitude value to pass its differentiated pulse portion.

10. In combination, an applied pulse having a leading edge, a trailing edge, and a given width, means for generating a sawtooth wave comprising means responsive to said leading edge for initiating the generation of the leading edge of a sawtooth wave, and means for controlling the amplitude and duration of said wave to be a function of said width, means for differentiating said applied pulse to provide marker pulses defining respectively said leading edge and trailing edge, means for superimposing said trailing edge marker pulse onto said wave, and means only responsive to said superimposed trailing edge marker pulse exceeding a lower amplitude level but not exceeding a higher amplitude level for providing an output signal.

References Cited in the file of this patent

UNITED STATES PATENTS

| | | |
|---|---|---|
| 2,356,140 | Applegarth | Aug. 22, 1944 |
| 2,519,057 | Luck | Aug. 15, 1950 |
| 2,545,464 | Hoeppner et al. | Mar. 20, 1951 |
| 2,597,322 | Higinbotham | May 20, 1952 |
| 2,634,346 | Hoeppner et al. | Apr. 7, 1953 |
| 2,694,145 | Christian | Nov. 9, 1954 |
| 2,744,196 | Hoeppner | May 1, 1956 |
| 2,777,947 | Hoeppner et al. | Jan. 15, 1957 |